(12) United States Patent
Chen et al.

(10) Patent No.: US 9,420,406 B2
(45) Date of Patent: Aug. 16, 2016

(54) METHOD AND APPARATUS FOR VEHICLE PROCESS EMULATION AND CONFIGURATION ON A MOBILE PLATFORM

(71) Applicant: Ford Global Technologies, LLC, Dearborn, MI (US)

(72) Inventors: Yifan Chen, Ann Arbor, MI (US); Gary Steven Strumolo, Beverly Hills, MI (US); Dimitar Petrov Filev, Novi, MI (US); Jeffrey Allen Greenberg, Ann Arbor, MI (US); Oleg Yurievitch Gusikhin, West Bloomfield, MI (US); Perry Robinson MacNeille, Lathrup Village, MI (US); Basavaraj Tonshal, Northville, MI (US); Krishnaswamy Venkatesh Prasad, Ann Arbor, MI (US); Paul Aldighieri, Grosse Pointe Farms, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1 day.

(21) Appl. No.: 14/179,071

(22) Filed: Feb. 12, 2014

(65) Prior Publication Data

US 2014/0163780 A1  Jun. 12, 2014

Related U.S. Application Data

(62) Division of application No. 13/229,889, filed on Sep. 12, 2011, now Pat. No. 8,694,203.

(51) Int. Cl.
*H04W 4/00* (2009.01)
*G08C 17/02* (2006.01)

(52) U.S. Cl.
CPC .............. *H04W 4/008* (2013.01); *G08C 17/02* (2013.01); *G08C 2201/30* (2013.01)

(58) Field of Classification Search
CPC ... G08C 17/02; G08C 2201/30; H04W 4/008; G06Q 10/06; G07C 5/0891; G07C 5/0866; G07C 5/008; H04N 7/163; H04N 21/4126; H04N 2005/4405; H04N 21/42204; H04N 21/43637; H04N 21/41422; G06F 3/0488; G06F 3/1454; G09G 2380/10

See application file for complete search history.

(56) References Cited

U.S. PATENT DOCUMENTS

| 6,526,335 B1 | 2/2003 | Treyz et al. |
| 7,207,041 B2 | 4/2007 | Elson et al. |

(Continued)

FOREIGN PATENT DOCUMENTS

| CN | 1867012 A | 11/2006 |
| CN | 201278210 Y | 7/2009 |
| CN | 102014155 A | 4/2011 |

OTHER PUBLICATIONS

Service Discovery Protocol (SDP) Layer Tutorial, Palowireless Bluetooth Research Center, http://www.palowireless.com/infotooth/tutorial/sdp.asp. Aug. 3, 2010.
IPhone Hacks, Apple Files Patent Which Allow You to Control Your Computer Remotely Using IPhone, http://www.iphonehacks.com/2009/12/apple-files-patent-which-could-allow-you-to-control-your-computer-remotely-using-iphone, Jun. 22, 2010.

(Continued)

*Primary Examiner* — Rodney Butler
(74) *Attorney, Agent, or Firm* — Jennifer M. Stec; Brooks Kushman P.C.

(57) ABSTRACT

A computer-implemented method includes providing an interface on a wireless device corresponding to an interface for vehicle infotainment system control. The method also includes providing simulated functionality of controls on the interface, such that activation of a control informs a user of what would occur if the control were activated on a vehicle interface. Further, the method includes saving at least one user setting input into the interface. The method additionally includes transferring the saved setting to a vehicle computing system (VCS) for use in infotainment system control when the wireless device is in communication with the VCS.

18 Claims, 3 Drawing Sheets

(56) References Cited

U.S. PATENT DOCUMENTS

| | | | |
|---|---|---|---|
| 7,266,435 | B2 | 9/2007 | Wang et al. |
| 7,505,784 | B2 | 3/2009 | Barbera |
| 7,602,782 | B2 | 10/2009 | Doviak et al. |
| 7,801,941 | B2 | 9/2010 | Conneely et al. |
| 8,131,458 | B1 | 3/2012 | Zilka |
| 8,847,731 | B2* | 9/2014 | Tieman ............ 340/5.62 |
| 2002/0098853 | A1 | 7/2002 | Chrumka |
| 2003/0079123 | A1 | 4/2003 | Mas Ribes |
| 2003/0147534 | A1 | 8/2003 | Ablay et al. |
| 2004/0203660 | A1 | 10/2004 | Tibrewal et al. |
| 2004/0260438 | A1 | 12/2004 | Chernetsky et al. |
| 2004/0267585 | A1 | 12/2004 | Anderson et al. |
| 2005/0091408 | A1 | 4/2005 | Parupudi et al. |
| 2005/0177635 | A1 | 8/2005 | Schmidt et al. |
| 2006/0047381 | A1* | 3/2006 | Nguyen ............ 701/29 |
| 2006/0150197 | A1 | 7/2006 | Werner |
| 2006/0156315 | A1 | 7/2006 | Wood et al. |
| 2006/0190097 | A1 | 8/2006 | Rubenstein |
| 2006/0287787 | A1 | 12/2006 | Engstrom et al. |
| 2006/0287821 | A1 | 12/2006 | Lin |
| 2007/0016362 | A1 | 1/2007 | Nelson |
| 2007/0042809 | A1 | 2/2007 | Angelhag |
| 2007/0042812 | A1 | 2/2007 | Basir |
| 2007/0050854 | A1 | 3/2007 | Cooperstein et al. |
| 2007/0132572 | A1 | 6/2007 | Itoh et al. |
| 2007/0294625 | A1 | 12/2007 | Rasin et al. |
| 2008/0148374 | A1 | 6/2008 | Spaur et al. |
| 2008/0220718 | A1 | 9/2008 | Sakamoto et al. |
| 2008/0313050 | A1 | 12/2008 | Basir |
| 2009/0075624 | A1 | 3/2009 | Cox et al. |
| 2009/0106036 | A1 | 4/2009 | Tamura et al. |
| 2009/0117890 | A1 | 5/2009 | Jacobsen et al. |
| 2009/0140064 | A1 | 6/2009 | Schultz et al. |
| 2009/0228908 | A1 | 9/2009 | Margis et al. |
| 2009/0253466 | A1 | 10/2009 | Saito et al. |
| 2009/0318119 | A1 | 12/2009 | Basir et al. |
| 2010/0062848 | A1* | 3/2010 | Ballay et al. ............ 463/31 |
| 2010/0063670 | A1 | 3/2010 | Brzezinski et al. |
| 2010/0094996 | A1 | 4/2010 | Samaha |
| 2010/0098853 | A1 | 4/2010 | Hoffmann et al. |
| 2010/0216509 | A1 | 8/2010 | Riemer et al. |
| 2010/0234071 | A1 | 9/2010 | Shabtay et al. |
| 2010/0262929 | A1* | 10/2010 | Avery ............ 715/771 |
| 2010/0268401 | A1* | 10/2010 | Blakemore et al. ............ 701/2 |
| 2010/0306309 | A1 | 12/2010 | Santori et al. |
| 2011/0043599 | A1 | 2/2011 | Luo et al. |
| 2011/0046842 | A1* | 2/2011 | Smith ............ 701/33 |
| 2011/0087385 | A1 | 4/2011 | Bowden et al. |
| 2011/0105097 | A1 | 5/2011 | Tadayon et al. |
| 2011/0112762 | A1 | 5/2011 | Gruijters et al. |
| 2011/0195659 | A1 | 8/2011 | Boll et al. |
| 2011/0296037 | A1 | 12/2011 | Westra et al. |
| 2012/0054300 | A1 | 3/2012 | Marchwicki et al. |
| 2012/0065815 | A1 | 3/2012 | Hess |
| 2012/0079002 | A1 | 3/2012 | Boll et al. |
| 2013/0282956 | A1* | 10/2013 | Ramdeo ............ 711/103 |
| 2014/0364108 | A1* | 12/2014 | Tibbitts et al. ............ 455/419 |

OTHER PUBLICATIONS

Zack Newmark, American, Concept Car, Ford, Gadgets, Lifestyle, Technology, Student develop in-car cloud computing apps; envision the future of in-car connectivity, May 4, 2010, http://ww.woldcarfans.com/print/110050425986/student-develop-in-car-cloud-computing_apps;_envision_the_future_of_in-car_connectivity.

Wikipedia, the free encyclopedia, X Window System, http://en.wikipedia.org/wiki/X_Window_System, Jun. 22, 2010.

Darryl Chantry, MSDN, Mapping Applications to the Cloud, 2010 Microsoft Corporation, Platform Architecture Team, Jan. 2009, http://msdn.microsoft.com/en-us/library/dd430340(printer).aspx, Jun. 18, 2010.

"MobileSafer is your personal safe driving assistant", 2010 ZoomSafer Inc. <http://zoomsafer.com/products/mobilesafer> Dec. 28, 2010.

"How PhonEnforcer Works" Turn Off the Cellphone While Driving—PhonEnforcer. Turn Off the Cell Phone LLC. <http://turnoffthecellphone.com/howitworks.htm> Dec. 28, 2010, pp. 1-3.

"PhonEnforcer FAQ's" Turn Off the Cellphone While Driving—PhonEnforcer. Turn Off the Cell Phone LLC. <http://turnoffthecellphone.com/faq.html> Dec. 28, 2010, pp. 1-2.

Lamberti, Ralph "Daimler Full Circle: The Rise of Vehicle-Installed Telematics—Telematics Munich 2009" Nov. 10, 2009.v.

Narasimhan, et al., A lightweight remote display management protocol for mobile devices, Application Research Center, Motorola Labs Schaumburg, IL, 2007, pp. 711-715.

Voelcker, Top 10 Tech Cars It's the Environment, Stupid, www.spectrum.ieee.org, Apr. 2008, pp. 26-35.

Yarden, et al., Tuki: A Voice-Activated Information Browser, IEEE, 2009, pp. 1-5.

Gil-Castineira, et al., Integration of Nomadic Devices with Automotive User Interfaces, IEEE Transactions on Consumer Electronics, vol. 55, No. 1, Feb. 2009.

Nusser, et al., Bluetooth-based Wireless Connectivity in an Automotive Environment, Robert Bosch GmbH, VTC 2000, pp. 1935-1942.

Antuan Goodwin, The Car Tech Blog, Ford Unveils open-source Sync developer platform, http://reviews.cnet.com/8301-13746_7-10385619-48.html, Oct. 2009, pp. 1-5.

Ford Motor Company, "SYNC with Navigation System," Owner's Guide Supplement, SYNC System Version 1 (Jul. 2007).

Ford Motor Company, "SYNC," Owners's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

Kermit Whitfield, "A hitchhiker's guide to the telematics ecosystem," Automotive Design & Production, Oct. 2003, http://findarticles.com, pp. 103.

CN Office Action issued Dec. 4, 2014 for Chinese Application No. 201210333365.7.

* cited by examiner

METHOD AND APPARATUS FOR VEHICLE PROCESS EMULATION AND CONFIGURATION ON A MOBILE PLATFORM

CROSS-REFERENCE TO RELATED APPLICATIONS

This application is a division of U.S. application Ser. No. 13/229,889 filed Sep. 12, 2011, now pending, the disclosure of which is hereby incorporated in its entirety by reference herein.

TECHNICAL FIELD

The illustrative embodiments generally relate to methods and apparatus for vehicle process emulation and configuration on a mobile platform.

BACKGROUND

With the integration of computers into numerous vehicle systems, the driver experience has been enhanced in numerous ways. One of the more noticeable improvements has been the inclusion of full color, touch navigable visual displays in the center stack of a vehicle. From entertainment to information, these displays provide a suite of options for improving the driving experience, options which can collectively be referred to as an infotainment system.

Many of the options are user configurable, and the menus and presentations are often designed to be intuitive to use. Radio controls, navigation systems, text, email and phone call presentations may all be available through the system, and, generally, the controls associated with these displays track to familiar controls from other devices which provide these options.

Typically, however, there may be additional system controls available through the infotainment system, and not all of these controls can "map" to controls in other aspects of life, especially if the controls are vehicle specific. Enablement and configuration of vehicle systems, seat settings, preferred climate control options, call handling functionality, navigation presentation, etc., are just some of the available options. While it may be obvious to many users that a play icon (a laterally aligned triangle) can be used to play a track on a CD, some of the other features may be less intuitive.

Additionally, some people are simply unfamiliar with what many others would consider to be "commonplace" icons, and some level of training may be required to use the features associated therewith. Unfortunately, when drivers are in a vehicle, they are typically focused on the task of driving. While this is obviously desirable from a safety perspective, it can result in the driver never familiarizing themselves with the infotainment system controls.

Many of the controls may also be disabled while the vehicle is in motion for safety reasons. It could be dangerous to have a driver adjusting seat controls through a visual interface while driving, so the controls may be locked until the vehicle is stopped. Since drivers typically don't spend a great deal of time in their car while it is parked, it may be the case that much functionality is overlooked, due to confusion or lack of knowledge. Unless the driver makes an effort to become familiar with the system controls, many great features of the infotainment system may go completely unused.

Also, users may have some crossover between phone-enabled features and infotainment features. For example, music could be played from a phone interface or using a vehicle system interface. If the user is familiar with the phone interface, and the phone interface varies from the vehicle system interface, the user may simply elect to use the phone interface on the phone instead of interacting with the vehicle. Similarly, many phones have navigation systems installed thereon. If the user is comfortable with the phone navigation interface, the vehicle navigation interface may go largely unused.

SUMMARY

In a first illustrative embodiment, a computer-implemented method includes providing an interface on a wireless device corresponding to an interface for vehicle infotainment system control. The illustrative method also includes providing simulated functionality of controls on the interface, such that activation of a control informs a user of what would occur if the control were activated on a vehicle interface.

Further, the method includes saving at least one user setting input into the interface. The method additionally includes transferring the saved setting to a vehicle computing system (VCS) for use in infotainment system control when the wireless device is in communication with the VCS.

In a second illustrative example, a computer-implemented method includes establishing communication between a vehicle computing system (VCS) and a wireless device. The method further includes determining that the wireless device has one or more native functions provided thereto that correspond to functions existent on the VCS.

Additionally, the method includes offering a user the option to import the function from the wireless device to use as an alternative to the corresponding VCS function. The method further includes downloading at least some functionality of the native function to the VCS and providing a function control interface corresponding to the native function in lieu of an interface associated with the corresponding VCS function, contingent on the user's selection of an import option.

In a third illustrative embodiment, a computer readable storage medium stores instructions that, when executed by a processor, cause the processor to execute a method including providing an interface on a wireless device corresponding to an interface for vehicle infotainment system control. The illustrative method further includes providing simulated functionality of controls on the interface, such that activation of a control informs a user of what would occur if the control were activated on a vehicle interface.

Also, the illustrative method includes saving at least one user setting input into the interface. The illustrative method additionally includes transferring the saved setting to a vehicle computing system (VCS) for use in infotainment system control when the wireless device is in communication with the VCS.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
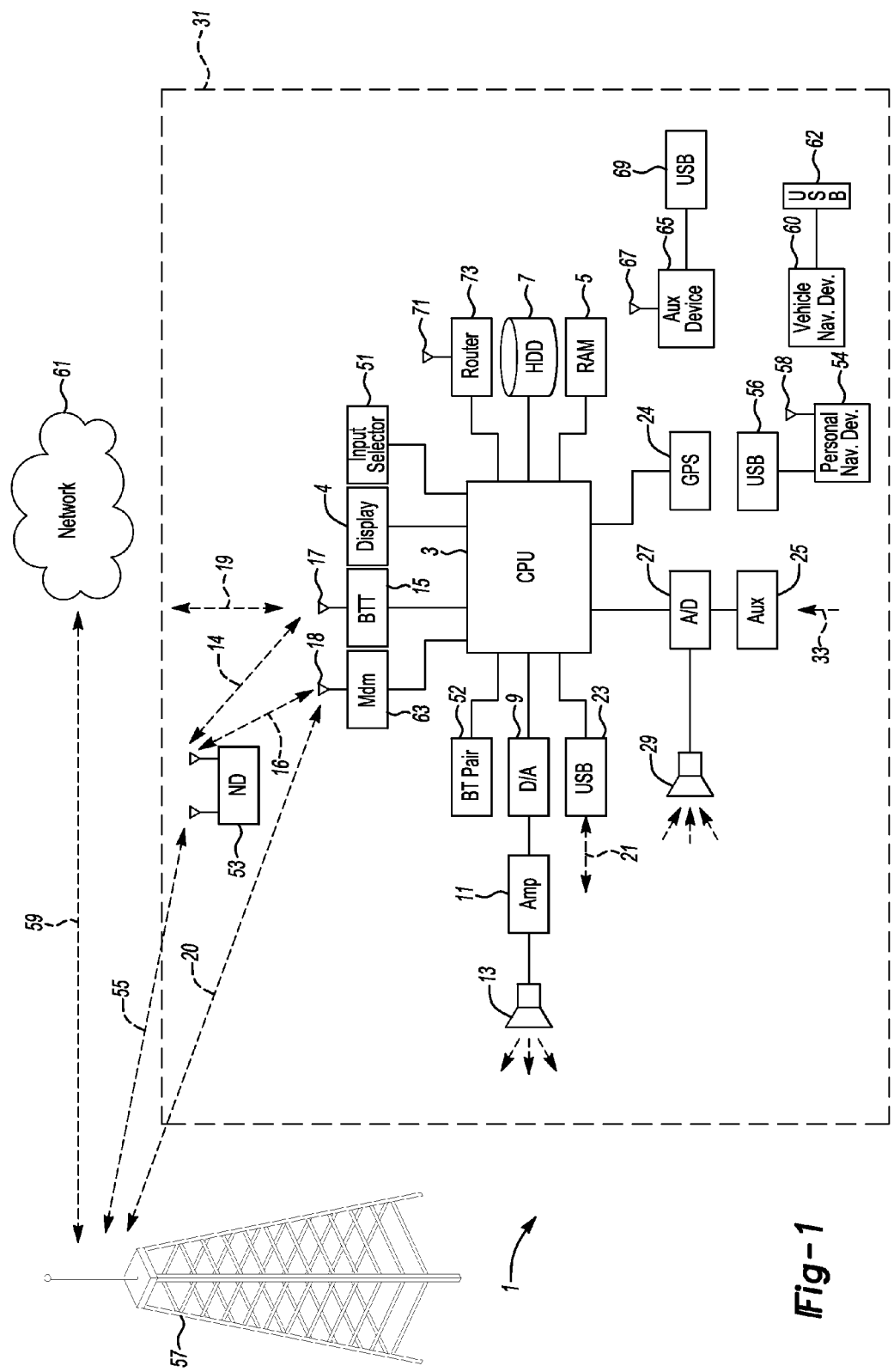
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domian Multiple Access (CDMA), Time Domain Multiple Access (TDMA), Space-Domian Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
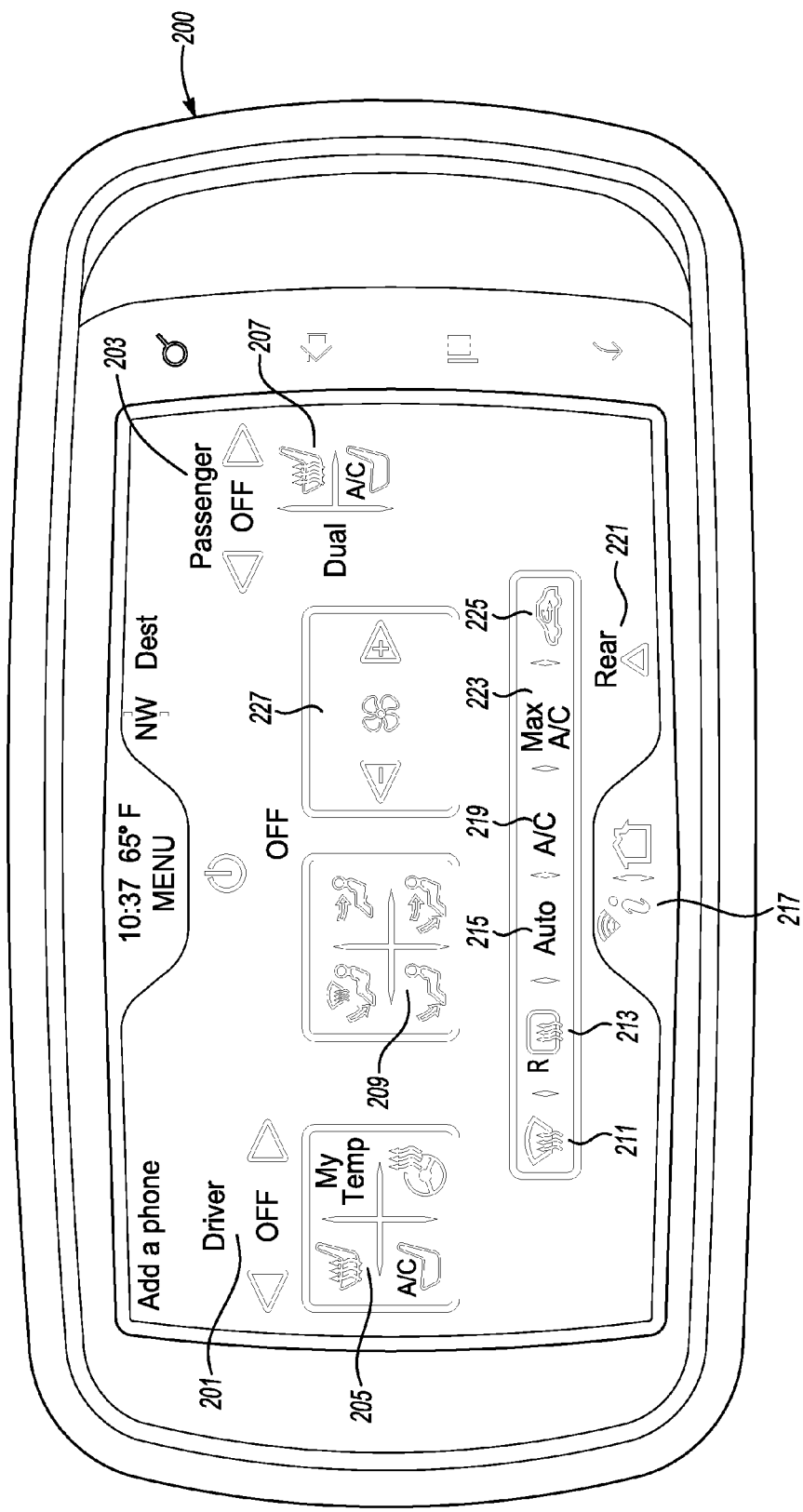
FIG. 2 shows an illustrative example of an infotainment process running on a smartphone.

FIG. 2 shows an illustrative example of an infotainment process running on a smartphone. Since the platform for which the infotainment process may have commonality with the platform running on certain mobile devices, transportation of some or all of the features of the infotainment process to a mobile device may be streamlined. Of course, the mobile device may not have, for example, seats to be adjusted, but the process could display information corresponding to seat adjustments or even a visual display of how an adjustment would affect a seat when running on a mobile device.

The process can be configured to recognize when it is running on a mobile device, and provide some indication of input effect when running in such an environment. Additionally or alternatively, if the mobile device is in proximity to or communication with a vehicle, the adjustments made on the mobile device may have direct effect on vehicle settings. In such an instance, it may be desirable to ensure that the process controller is actually driving the vehicle (or sitting in a driver seat) such that control of a vehicle system by a party not driving the vehicle is not enacted. This can be done in a variety of fashions, including, but not limited to, using a proximal wireless technology, such as RFID, for example, to ensure that the mobile device is at least in close proximity to a driver seat when being operated.

In this illustrative example, vehicle HVAC and climate control functionality is being emulated on a smart phone 200. If the phone is in proximity to a vehicle (or in communication with a vehicle with a permissible control status enabled), the phone can actually be used to actively set the climate control of the vehicle in real time.

In other instances, settings may be saved on the device and imported into the vehicle, or, in another case, the user may just want to tinker with the climate control interface to better gain an understanding of how the system works. Since this interface can be used at any location where the user has a phone, it may be far more convenient a platform under which to use the interface. Clicking on, for example, element 221 may pop up a window notifying the user that such a selection, if made on the vehicle interface, would enable the hazard lights. Once the user has become familiar with the vehicle climate control interface, use of the interface while in the vehicle will be greatly facilitated.

In this illustrative example, the user can control either a driver side climate control 201 or a passenger side climate control 203. Once a particular side or sides have been selected for control, various aspects of climate control can be engaged.

In this example, the driver can control personalized, driver-side climate options 205. These illustratively include, but are not limited to, heated or cooled seats, a heated steering wheel, and a driver temperature preference. Additionally or alternatively, the operator can control passenger side options 207, such as heated or cooled seats (or other available options not shown).

The operator can also select air delivery controls 209 and air delivery power 227. Further controls include, but are not limited to, front defog 211, rear defrost 213, auto temperature control 215, air conditioning options 219, max AC settings 223 and air recirculation 225.

Also included in the options is an information button 217, that can provide user tips about various functions viewed on the shown device menu. It could even be possible to include tutorials with pop-up displays that can guide a user through a user-selected or predetermined control sequence so that the user can better understand the functionality of a given display.

Figure 3:
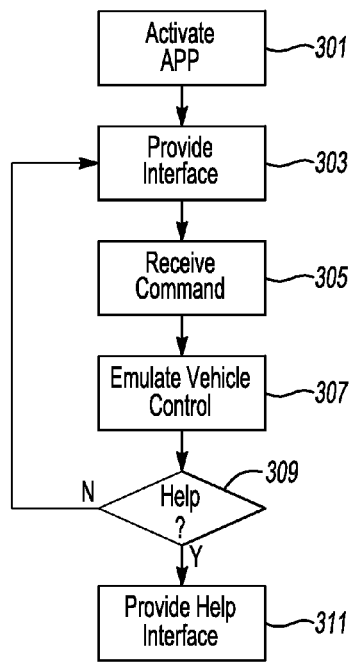
FIG. 3 shows an illustrative example of an emulation process.

FIG. 3 shows an illustrative example of an emulation process. In this example, an application corresponding to one or more aspects of a vehicle control system have been loaded onto a smartphone. The application can be activated 301 and an interface, such as that shown in FIG. 2 can be shown to a user 303 for interaction.

Once the interactable user interface is shown, it can receive one or more commands from a user 305. Typically, these commands will correspond to inputs that could also be interacted with in a vehicle, although additional inputs relating to, for example, help requests could also be received.

Once a command corresponding to a vehicle control has been input, the process will, in this embodiment, emulate control of a vehicle system 307. This can be done through a text or visual display, and may include audio information if desired.

The illustrative process may also include an option to receive help on a particular command 309. If a help option is selected, a help interface or more information on a command may be displayed 311. The interface may additionally include an option to have a tutorial launched on the command, or a tutorial which includes usage of the command as part of the learning process. Once the help process has completed, the system may return to displaying the interface for interaction.

In other embodiments, if the phone is proximate to and/or in permissible communication with an actual vehicle, input of the commands may be used to directly control a vehicle system. In this manner, a user can see the real results of inputting various commands. Additionally or alternatively, vehicle settings can be saved to the wireless device and transferred into the vehicle once the phone is in communication with the vehicle. For example, if a user is walking back to a vehicle and it is a hot day, the user can begin the process of configuring an HVAC system to cool the vehicle before even reaching the vehicle.

Figure 4:
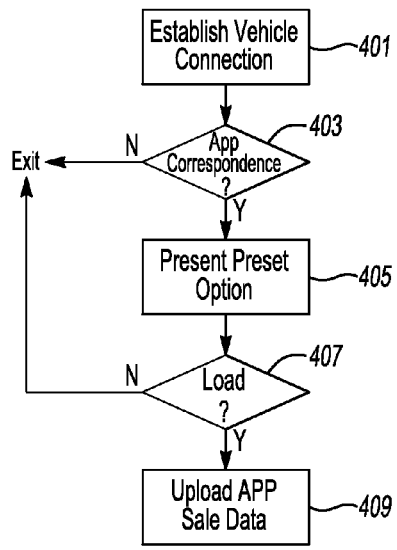
FIG. 4 shows an illustrative example of a configuration transfer process.

FIG. 4 shows an illustrative example of a configuration transfer process. In this illustrative example, communication is established between a wireless device and a vehicle computing system 401. The process checks to see if there is a correspondence between a vehicle computing interface and a wireless device application 403. Since a user's phone may interface with various vehicles, it may only be desirable to transfer settings when a correspondence exists (e.g., the user is in a vehicle from which an interface was obtained).

If there is a commonality of interface between the application and the vehicle computing interface, the process may present an option to upload the preset settings from the wireless device to a vehicle. For example, different users may elect to have different preset radio stations corresponding to their own preferences. These stations can be pre-selected on a phone interface, in the same manner they would be in a vehicle. When a user's phone interfaces with a vehicle computing system, the user's selection of the preset stations on the phone interface can be imported to a vehicle system, preventing the user from having to repeat the steps of configuration. The settings may revert when the user leaves the vehicle, or, for example, change when a new user enters the vehicle with different settings (prioritization can be established for an instance where multiple phones emulating a vehicle interface are present).

In this example, the user is given an option to load one or more settings from the wireless device 407, although such an option could also be automatically set once by a user to provide for automatic upload. If loading is selected, the process proceeds to upload settings from the device to the vehicle infotainment system.

Figure 5:
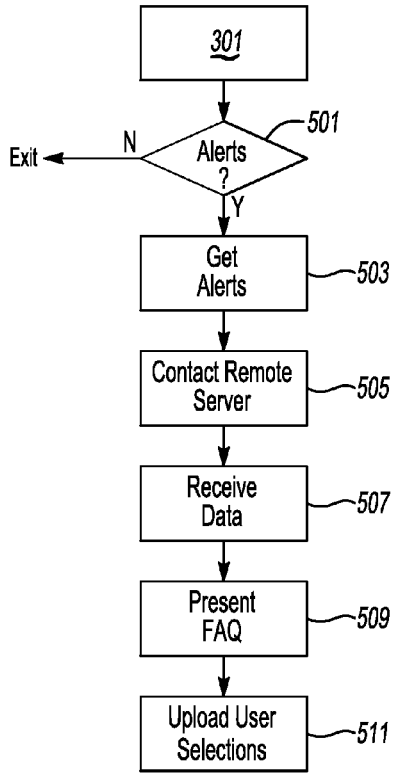
FIG. 5 shows an illustrative example a frequently asked questions process.

FIG. 5 shows an illustrative example a frequently asked questions process. In this illustrative example, user data can be crowdsourced to develop a series of questions and answers most useful to users and relating to system functionality. In one example, a user may receive one or more alerts from a vehicle infotainment system relating to vehicle systems that may be sub-optimal or have a problem associated therewith.

When the user is in a vehicle, the user may wish to travel to a destination, and not have time to deal with a system issue. But, if the same alerts can be delivered to a wireless device, the user may be better equipped to deal with any potential problems, having the luxury of time that was not intended to be spent driving.

Further, the user can, through emulation of a vehicle interface, learn how to correct certain problems using a vehicle interface, encouraging more usage of the interface when the user is in the vehicle.

In this example, the wireless device establishes communication with a vehicle computing system 401. Since the user may want to address alert situations while not present at a vehicle, this communication can be established, for example, through a remote connection such as a phone call placed to a vehicle embedded phone. Additionally or alternatively, alerts can be stored remotely while a user is in a vehicle, or stored on a phone, and then provided to a user at a more convenient time for the user to address the alerts.

If at least one alert is present 501, the process may gather all existing alerts 503 for delivery to a user on a wireless device interface. Further, since crowdsourcing may provide data that is relevant to a particular alert (through, for example, determining what data was useful to other users experiencing a similar alert), the process may connect to a remote server 505 to access crowdsourced data 507.

For example, one alert may be due to low air in a tire. Examples of information that may be useful include, but are not limited to, optimal tire pressures, an explanation of how to fill a tire, changes in pressure due to seasonal changes, etc. Users accessing the data may sort, organize and provide feedback on the usefulness of data. Crowdsourced FAQs are discussed in greater detail in co-pending U.S. application Ser. No. 12/869,032 filed Aug. 26, 2010 entitled METHOD AND APPARATUS FOR DRIVER ASSISTANCE, the contents of which are incorporated herein by reference.

The data can be presented to a user 509, initially in an order which is most commonly useful to all users. If the user provides feedback, however, that feedback can be uploaded to the server for further sorting of data 511. In addition to being generally useful to sort data, the information can also be used to specifically sort data for a given user.

For example, it may be observed that a "basic" answer about tire pressure (e.g., how to fill a tire) is very useful to certain users and less needed by others. On the other hand, more "technical" users may find the tire-pressure settings to be the primarily useful data. By correlating one user's responses with that of other users, commonalities between like-minded users can be observed, and better organization of data can be achieved. "Basic" users can first receive fundamental knowledge, followed by system specific knowledge, whereas more "advanced" users can receive the system specific knowledge as a first option.

Figure 6:
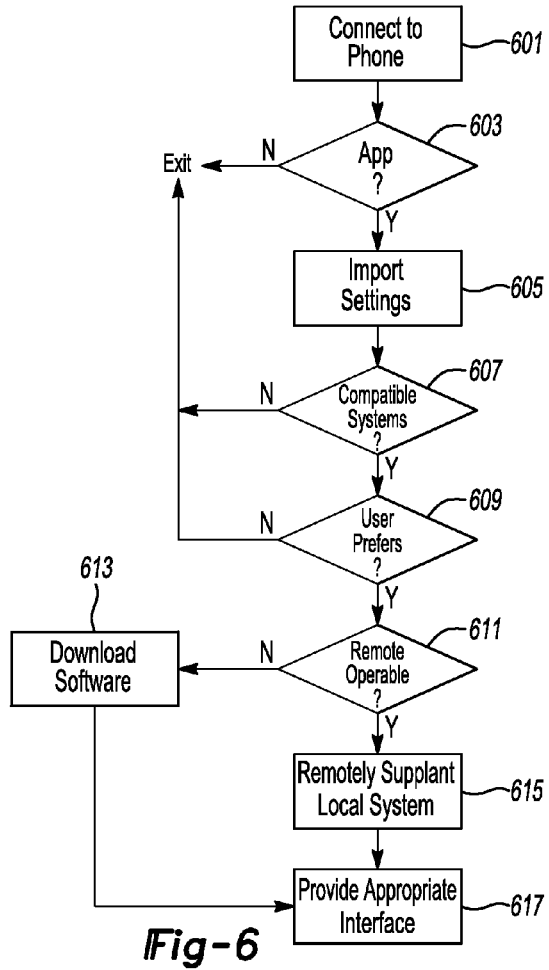
FIG. 6 shows an illustrative example of a functionality migration process.

FIG. 6 shows an illustrative example of a functionality migration process. Users may constantly use certain features on their wireless devices. For example, navigation or media control functionality may be options that a particular user has become very familiar with on a wireless device. Additionally, the user may not wish to learn a new format for some of this functionality, as they may be comfortable with the functionality of which they already have some knowledge.

Since user interfaces for phone functionality and vehicle infotainment systems may be built on common operating platforms, it may be a relatively simple task to import functionality from a wireless device to an infotainment system. Additionally or alternatively, this may save development time of certain features, if fully functional features can simply be imported from wireless devices.

In this example, the VCS connects to a wireless device 601. In this process, the system determines if an application exists on the phone (such as, but not limited to, media control, navigation, phone controls, etc.) that corresponds to vehicle infotainment system functionality 603. If an application corresponding to a vehicle function exists on the phone, the process may import settings for that application. In this instance, for example, the vehicle function could still be used, but settings from a similar phone application could be imported 605 (e.g., without limitation, address settings for a navigation system).

Also, the process may check for compatibility between a vehicle platform and a process provided on the phone 607. This could include, for example, determining if a phone enabled navigation process could work on a vehicle computing platform. If there is a compatibility between the process and the platform, the process may ask a user if they prefer to use the phone version of the process 609.

If the user prefers the phone version, it may be determined whether it is appropriate to run the process on the phone, using the VCS interface, or if it would be appropriate to provide the entire process running on the VCS 611. For example, with regards to a navigation system, remote operation could consist of address selection through a VCS, and then communication with a phone enabled GPS and fundamental process to determine directions. Directions could be relayed to the VCS as they are determined and output to the user. The user may not even be aware that the wireless device was being leveraged for computing power, and such interaction could free up cycles of the vehicle computing system to aid in faster processing of other requests.

If remote operation is not possible or not desired, a software package corresponding to the phone functionality may be downloaded to the VCS 613. If, however, remote processing is desired or operable, the process may simply supplant certain functionality of a corresponding process on the VCS 615. In either event, a user interface may also be presented 617.

In this manner, it may even be able to provide, for example, navigation to a vehicle that lacks a GPS system. Through leveraging the phone as a GPS engine, a vehicle infotainment system could have navigation "added" thereto by downloading and providing an interface, and by leveraging the wireless device for functionality not available in the VCS. Thus, users can "upgrade" system functionality through use of a phone equipped with compatible, desired capability.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer-implemented method comprising:
    establishing communication between a vehicle computing system (VCS) and a wireless device;
    determining that the wireless device has a native function that corresponds to a VCS function;
    offering an option to import a wireless device native function interface to the VCS;
    contingent on import-confirmation, downloading the wireless device native function interface to the VCS; and
    providing the wireless device native function control interface in lieu of a corresponding standard VCS interface.

2. The method of claim 1, wherein the native function includes a navigation function.

3. The method of claim 1, wherein the native function includes a phone control function.

4. The method of claim 1, wherein the native function includes an entertainment control function.

5. The method of claim 1, wherein the entire native function is downloaded to and run by the VCS.

6. The method of claim 1, wherein only a portion of the native function is downloaded to and run by the VCS, and wherein at least some portion of the native function is still run by the wireless device after receiving commands input into the function control interface provided on the VCS.

7. A non-transitory computer readable storage medium storing instructions that, when executed by a processor, cause the processor to execute a method comprising:
    establishing communication between a vehicle computing system (VCS) and a wireless device;
    determining that the wireless device has a native function that corresponds to a VCS function;
    offering an option to import a wireless device native function interface to the VCS;
    contingent on import-confirmation, downloading the wireless device native function interface to the VCS; and
    providing the wireless device native function control interface at the vehicle in lieu of a standard interface associated with the corresponding VCS function.

8. The non-transitory computer readable storage medium of claim 7, wherein the native function includes a navigation function.

9. The non-transitory computer readable storage medium of claim 7, wherein the native function includes a phone control function.

10. The non-transitory computer readable storage medium of claim 7, wherein the native function includes an entertainment control function.

11. The non-transitory computer readable storage medium of claim 7, wherein the entire native function is downloaded to and run by the VCS.

12. The non-transitory computer readable storage medium of claim 7, wherein only a portion of the native function is downloaded to and run by the VCS, and wherein at least some portion of the native function is still run by the wireless device after receiving commands input into the function control interface provided on the VCS.

13. A native process emulation system comprising:
    at least one processor configured to establish communication between a vehicle computing system (VCS) and a wireless device;
    determine that the wireless device has a native function that corresponds to a VCS function;
    offer an option to import a wireless device native function interface to the VCS;
    contingent on import-confirmation, download the wireless device native function interface to the VCS; and
    provide the wireless device native function control interface at the vehicle in lieu of a standard interface associated with the corresponding VCS function.

14. The native process emulation system of claim 13, wherein the native function includes a navigation function.

15. The native process emulation system of claim 13, wherein the native function includes a phone control function.

16. The native process emulation system of claim 13, wherein the native function includes an entertainment control function.

17. The native process emulation system of claim 13, wherein the entire native function is downloaded to and run by the VCS.

18. The native process emulation system of claim 13, wherein only a portion of the native function is downloaded to and run by the VCS, and wherein at least some portion of the native function is still run by the wireless device after receiving commands input into the function control interface provided on the VCS.

* * * * *